(12) United States Patent
Ishii

(10) Patent No.: US 7,988,241 B2
(45) Date of Patent: Aug. 2, 2011

(54) BRAKE SYSTEM

(75) Inventor: Nobuyuki Ishii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 805 days.

(21) Appl. No.: 12/006,832

(22) Filed: Jan. 4, 2008

(65) Prior Publication Data

US 2008/0210496 A1 Sep. 4, 2008

(30) Foreign Application Priority Data

Jan. 22, 2007 (JP) ................................. 2007-011108

(51) Int. Cl.
*B60T 8/88* (2006.01)
*B60T 13/18* (2006.01)

(52) U.S. Cl. ............ 303/122.12; 303/122.08; 303/116.1; 303/11; 303/20

(58) Field of Classification Search .................. 303/122, 303/122.04, 122.05, 122.08, 122.09, 122.1, 303/122.11, 122.12, 112.13, 122.14, 10, 303/11, 20, 116.1, 116.4

See application file for complete search history.

(56) References Cited

U.S. PATENT DOCUMENTS

| | | | | |
|---|---|---|---|---|
| 5,558,414 A | * | 9/1996 | Kubota | 303/122.08 |
| 5,779,327 A | * | 7/1998 | Nakashima et al. | 303/122.12 |
| 5,957,549 A | * | 9/1999 | Nagai et al. | 303/122.12 |
| 6,976,708 B2 | * | 12/2005 | Aoki et al. | 280/807 |
| 2004/0168844 A1 | * | 9/2004 | Goransson et al. | 180/242 |
| 2006/0082217 A1 | * | 4/2006 | Hatano et al. | 303/122 |
| 2007/0194621 A1 | * | 8/2007 | Ishizuka | 303/122.12 |
| 2007/0278855 A1 | * | 12/2007 | Hatano | 303/116.1 |

FOREIGN PATENT DOCUMENTS

JP 2005-343366 12/2005

* cited by examiner

*Primary Examiner* — Thomas J Williams
(74) *Attorney, Agent, or Firm* — Carrier Blackman & Associates, P.C.; Joseph P. Carrier; William D. Blackman

(57) ABSTRACT

A brake system includes an electric brake force generator for braking a wheel of a vehicle by a driving force of an electric motor. A problem determination device is provided in which the problem determination device sends an electrical signal to the electric motor such that the electric motor rotates in a direction opposite that of the direction of rotation to generate a brake force. If a rotation of the electric motor is not detected, then the problem determination device determines that a problem has occurred.

14 Claims, 4 Drawing Sheets

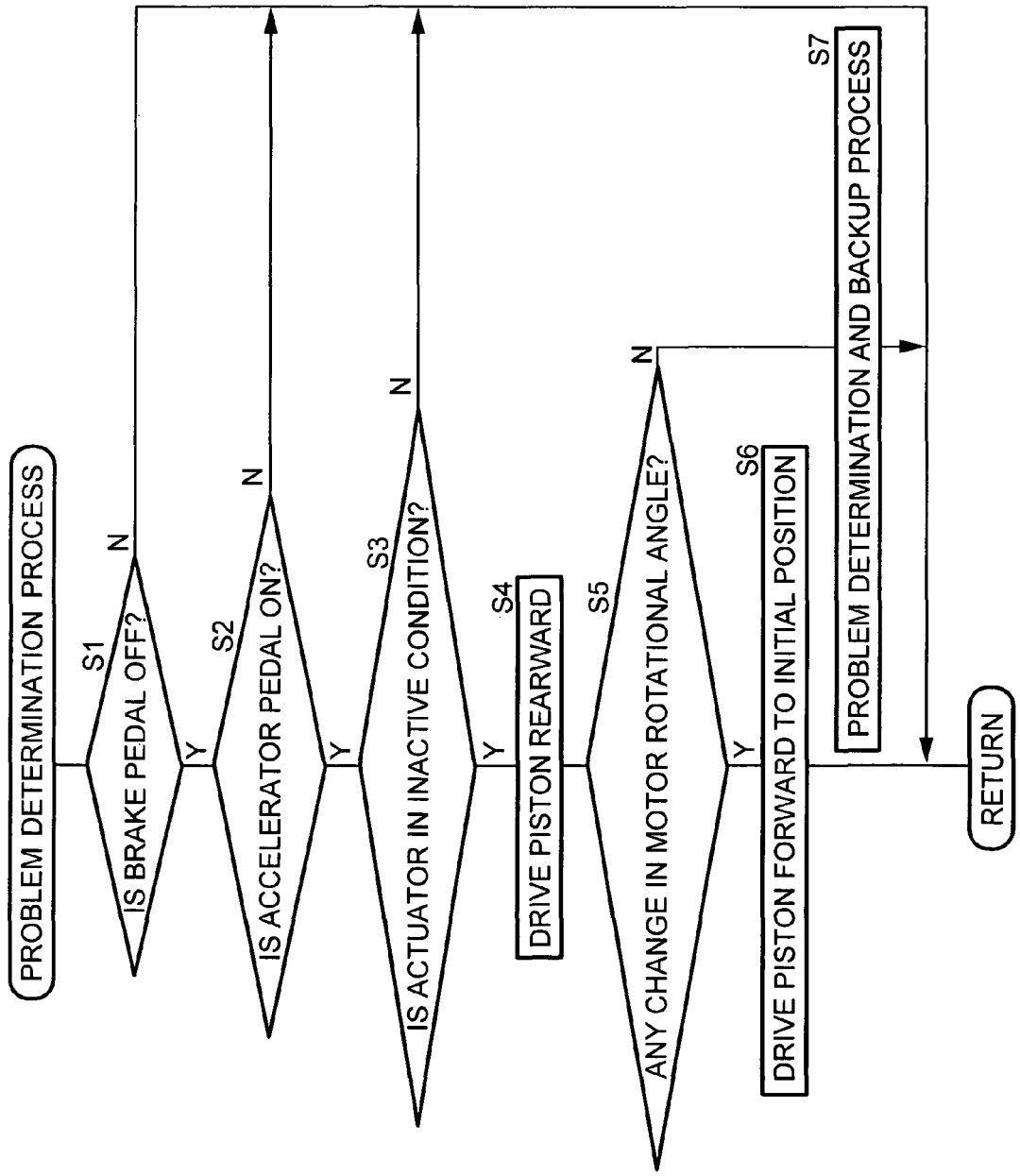

BRAKE SYSTEM

CROSS-REFERENCE TO RELATED APPLICATIONS

The present invention claims priority under 35 USC §119 based on Japanese patent application No. 2007-11108 filed 22 Jan. 2007. The subject matter of this priority document is incorporated by reference herein.

BACKGROUND OF THE INVENTION

1. Field of the Invention

The present invention relates to a brake system comprising an electric brake force generator or generating means that brakes a wheel by a driving force of an electric motor.

2. Description of the Related Art

Japanese Patent Application Laid-open No. 2005-343366 discloses a brake system of the type referred to as a brake by wire (BBW) brake system, which converts a braking operation of a driver into an electrical signal used to operate an electric brake force generator or generating means, such as a motor cylinder, and operates a wheel cylinder by brake fluid pressure generated by the motor cylinder.

When a problem occurs that renders inoperable an electric motor of an electric brake force generating means (slave cylinder) of the BBW brake system, or a problem that causes a seizure of a ball screw mechanism for converting a driving force of an electric motor into advance and retreat movements of a piston, it is required to perform a failsafe or backup process for braking by using brake fluid pressure generated by a master cylinder instead of the brake fluid pressure generated by the slave cylinder.

In order to determine whether the slave cylinder is functioning normally, it may be determined whether the electric motor is rotating normally or whether the piston is moving normally forward when the driver applies a pushing force to a brake pedal. However, in the system where the problem determination is performed based on the pushing force applied to the pedal by the driver, it is impossible to determine the occurrence of a problem before the driver applies the pushing force to the brake pedal to operate the slave cylinder, leading to a possibility that the backup process cannot be quickly performed upon the occurrence of the problem.

SUMMARY OF THE INVENTION

The present invention has been made in view of the above-described circumstances, and has an object to reliably determine occurrence of a problem in an electric brake force generating means or generator.

To achieve the above object, according to a first aspect of the present invention, there is provided a brake system comprising: an electric brake force generator that brakes a wheel by a driving force of an electric motor; and a problem determining device that supplies an electrical current so as to rotate the electric motor in a direction opposite to a brake force generating direction, and determines that a problem has occurred when the rotation of the electric motor is not detected.

A slave cylinder 23 of an exemplary embodiment of the present invention corresponds to the electric brake force generator of the present invention, and an electronic control unit U corresponds to the problem determining device of the present invention.

With the first aspect of the present invention, an electrical current is supplied so as to rotate the electric motor of the electric brake force generator in the direction opposite to the brake force generating direction, and it is determined that a problem has occurred when the rotation of the electric motor is not detected. Therefore, even if the electric brake force generator is not being operated, it is possible to reliably perform a problem determination process. Also, the problem determination process can be performed before the electric brake force generator actually operates, so that it is possible to quickly perform a backup process when it is determined that a problem has occurred.

According to a second aspect of the present invention, in addition to the first aspect, the problem determining device performs the determination process when a driver is applying a pushing force to an accelerator pedal.

With the second aspect of the present invention, when a driver is applying a pushing force to the accelerator pedal, that is, when it is ensured that a predetermined time exists until the driver performs the next braking operation, the problem determination process is performed with respect to the electric brake force generator. Therefore, it is possible to avoid a situation where the electric brake force generator is operated during the problem determination process to affect the problem determination.

According to a third aspect of the present invention, in addition to the first aspect, the problem determining device performs the determination process when the electric brake force generator is not generating brake fluid pressure.

With the third aspect of the present invention, the problem determination process is performed when the electric brake force generator is not generating brake fluid pressure. Therefore, it is possible to prevent a situation where the problem determination process renders the electric brake force generator incapable of generating a braking force.

According to a fourth aspect of the present invention, in addition to the third aspect, the brake system comprises: a master cylinder that generates brake fluid pressure by a braking operation by a driver; a wheel cylinder that brakes the wheel by the brake fluid pressure generated by the master cylinder or the electric brake force generator, wherein the electric brake force generator generates brake fluid pressure by a driving force of the electric motor, and the electric brake force generator is arranged between the master cylinder and the wheel cylinder; and a controller which controls the master cylinder and the wheel cylinder to communicate with each other when the electric brake force generator is not generating brake fluid pressure.

With the fourth aspect of the present invention, the master cylinder and the wheel cylinder communicate with each other when the electric brake force generator arranged between the master cylinder and the wheel cylinder is not generating brake fluid pressure, that is, when there is a possibility that the problem determination process is performed. Therefore, when it is determined that a problem has occurred, it is possible to easily perform the backup braking process by transmitting the brake fluid pressure generated by the master cylinder to the wheel cylinder without shutting off the brake fluid pressure at the electric brake force generator.

BRIEF DESCRIPTION OF THE DRAWINGS

FIG. 4 is a flowchart showing a problem determination process of an embodiment of the present invention, with respect to a slave cylinder.

DESCRIPTION OF THE PREFERRED EMBODIMENT

An embodiment of the present invention will be described with reference to FIGS. 1 to 4.

Figure 1:
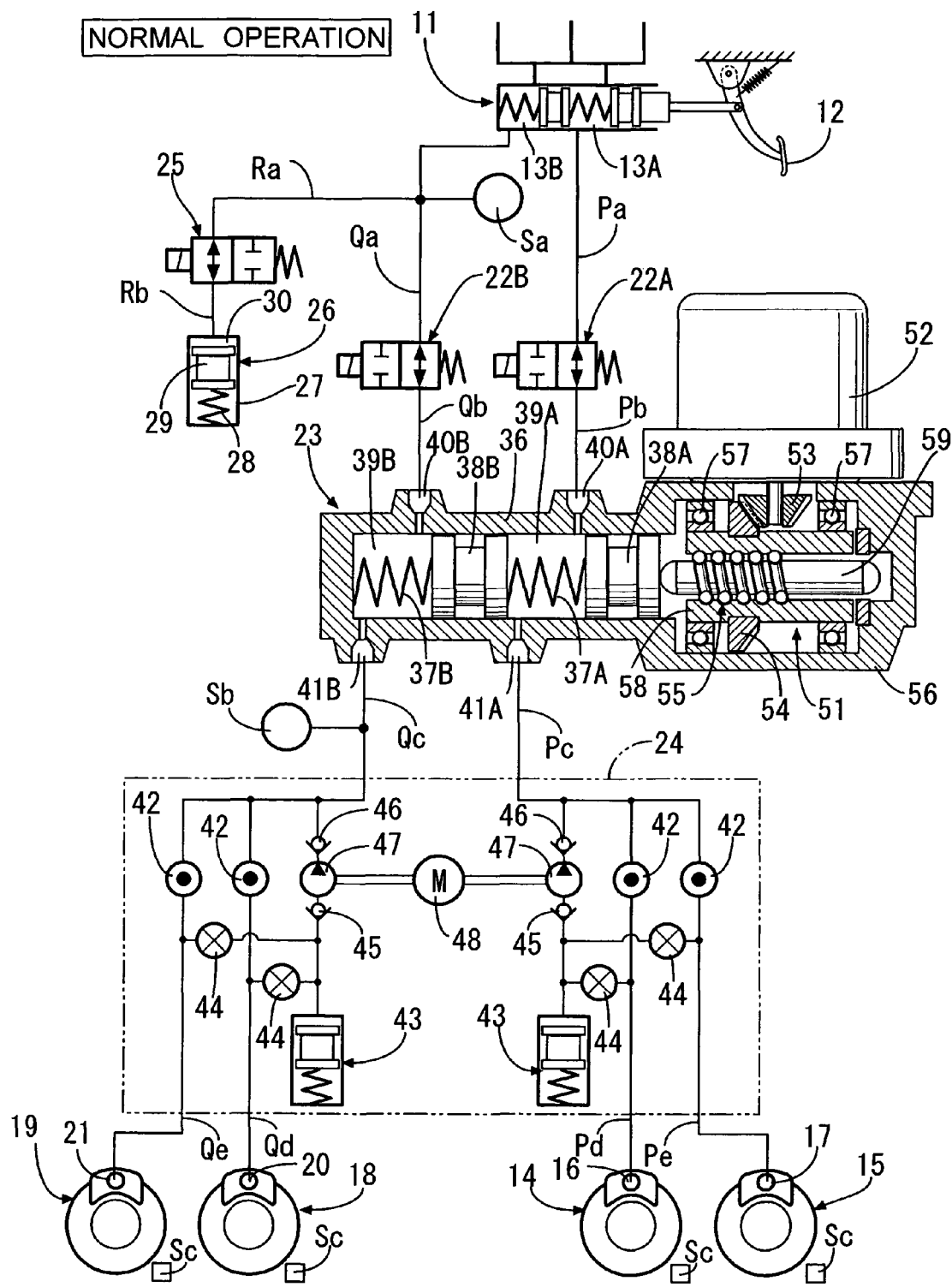
FIG. 1 is a fluid-pressure circuit diagram of a vehicle brake system according to an embodiment of the preset invention under normal operating conditions.

As shown in FIG. 1, a tandem master cylinder 11 has two fluid pressure chambers 13A and 13B which output brake fluid pressure according to a pushing force applied to a brake pedal 12 by a driver depressing the brake pedal 12. One of the fluid pressure chambers 13A is connected to wheel cylinders 16 and 17 of disc brake devices 14 and 15 for braking, for example, a left front wheel and a right rear wheel through fluid passages Pa, Pb, Pc, Pd, and Pe. The other first fluid pressure chamber 13B is connected to wheel cylinders 20 and 21 of disc brake devices 18 and 19 for braking, for example, a right front wheel and a left rear wheel through fluid passages Qa, Qb, Qc, Qd, and Qe.

A shutoff valve 22A, which is a normally open solenoid valve, is provided between the fluid passages Pa and Pb. A shutoff valve 22B, which is a normally open solenoid valve, is provided between the fluid passages Qa and Qb. A slave cylinder 23 is provided between the fluid passages Pb, Qb and the fluid passages Pc, Qc. An anti-lock brake system (ABS) 24 is provided between the fluid passages Pc, Qc and the fluid passages Pd, Pe; Qd, Qe.

A reaction force permission valve 25, which is a normally closed solenoid valve, is connected between a fluid passage Ra branching from the fluid passage Qa and a fluid passage Rb. A stroke simulator 26 is connected to the fluid passage Rb. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 51 of the slave cylinder 23 has a drive bevel gear 53 provided on the rotating shaft of an electric motor 52, a follower bevel gear 54 meshing with the drive bevel gear 53, and a ball screw mechanism 55 operated by the follower bevel gear 54. A sleeve 58 is rotatably supported in an actuator housing 56 via a pair of ball bearings 57. An output shaft 59 is coaxially arranged on an inner periphery of the sleeve 58. The follower bevel gear 54 is arranged on an outer periphery of the sleeve 58.

A pair of pistons 38A and 38B urged in a retreat direction by a pair of return springs 37A and 37B are slidably disposed in a cylinder body 36 of the slave cylinder 23. A pair of fluid pressure chambers 39A and 39B are defined on the front faces of the pistons 38A and 38B, respectively. A front end of the output shaft 59 abuts on a rear end of the rear piston 38A. One of the fluid pressure chamber 39A communicates with the fluid passages Pb, Pc via ports 40A, 41A, while the other fluid pressure chamber 39B communicates with the fluid passages Qb, Qc through ports 40B, 41B.

The structure of the ABS 24 is of a well-known type. The ABS 24 has two streams structurally identical to each other: a stream including the disc brake devices 14 and 15 for braking the left front wheel and the right rear wheel; and a stream for the disc brake devices 18 and 19 for braking the right front wheel and the left rear wheel. Of these streams, the stream for the disc brake devices 14 and 15 will be described as a representative, with the understanding that the stream for disk brakes 18 and 19 works in a similar fashion. A pair of in-valves 42 comprising normally open solenoid valves are provided between the fluid passage Pc and the fluid passages Pd, Pe. A pair of out-valves 44 comprising normally closed solenoid valves are provided between the fluid passages Pd, Pe on the downstream side of the in-valves 42 and a reservoir 43. A fluid pressure pump 47 interposed between a pair of check valves 45 and 46 is provided between the reservoir 43 and the fluid passage Pc. The fluid pressure pump 47 is driven by an electric motor 48.

Figure 3:
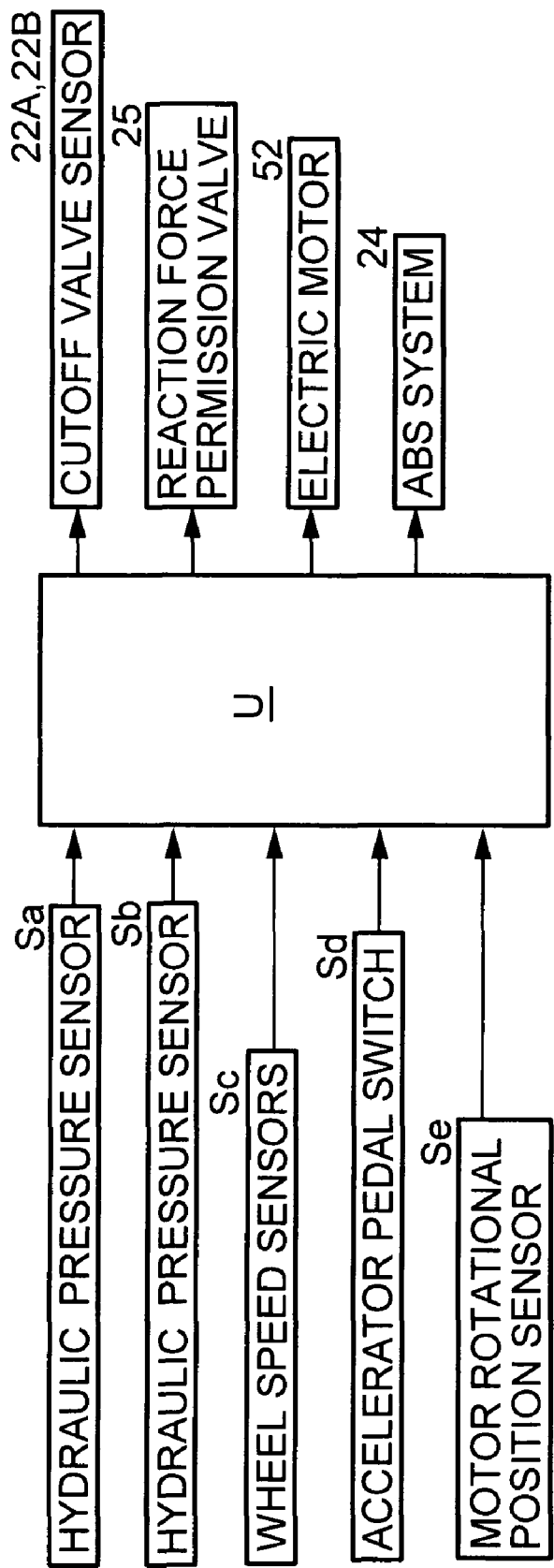
FIG. 3 is a block diagram of a control system of the vehicle brake system according to an embodiment of the present invention.

As shown in FIG. 3, connected to an electronic control unit or controller U for controlling the operation of the shutoff valves 22A and 22B, the reaction force permission valve 25, the electric motor 52 of the slave cylinder 23 and the ABS 24, are a fluid pressure sensor Sa for detecting the brake fluid pressure generated by the master cylinder 11, a fluid pressure sensor Sb for detecting the brake fluid pressure transmitted to the disc brake devices 18 and 19, vehicle wheel speed sensors Sc for detecting the vehicle wheel speeds of the vehicle wheels, an accelerator pedal switch Sd for detecting operation of an accelerator pedal (not shown), and a motor rotational position sensor Se for detecting the rotational position of the electric motor 52.

The operation of an exemplary embodiment of the present invention having the above-described arrangement will now be described.

When the system is operating under normal conditions, the shutoff valves 22A and 22B, comprising normally open solenoid valves, are demagnetized so as to be in an open state, and the reaction force permission valve 25, comprising a normally closed solenoid valve, is magnetized so as to be in an open state. In this state, when the fluid pressure sensor Sa provided in the fluid passage Qa detects a pushing force on the brake pedal 12 by the driver, the actuator 51 of the slave cylinder 23 is operated. That is, when the electric motor 52 is driven in one direction, the output shaft 59 is advanced by the drive bevel gear 53, the follower bevel gear 54 and the ball screw mechanism 55, so that the pair of the pistons 38A and 38B urged by the output shaft 59 are advanced. Because the ports 40A and 40B leading to the fluid passages Pb and Qb are closed quickly after the pistons 38A and 38B begin to advance, a brake fluid pressure is generated in the fluid pressure chambers 39A and 39B. This brake fluid pressure is transmitted to the wheel cylinders 16, 17, 20, and 21 of the disc brake devices 14, 15, 18, and 19, respectively, through the opened in-valves 42 of the ABS 24, thereby braking the vehicle wheels.

Because the ports 40A and 40B leading to the fluid passages Pb and Qb are closed by the pistons 38A and 38B, the brake fluid pressure generated by the master cylinder 11 is not transmitted to the disc brake devices 14, 15, 18, and 19. At this time, the brake fluid pressure generated in the other fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 to eliminate an uncomfortable feeling to the driver.

The operation of the actuator 51 for the slave cylinder 23 is controlled so that the brake fluid pressure generated by the slave cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the pushing force applied to the brake pedal 12 by the driver.

If slip ratio of any vehicle wheel is increased and a tendency of locking is detected based on the output from the wheel speed sensor Sc corresponding to a vehicle wheel during the above-described braking, the ABS 24 is operated in a state in which the slave cylinder 23 is maintained in the operating state, thereby preventing locking of the vehicle wheel.

That is, when any vehicle wheel has a tendency of locking, a pressure reducing operation is performed to release the brake fluid pressure in the wheel cylinder by opening the out-valve 44 such that the transmission of the brake fluid pressure from the slave cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered to reduce the slip ratio, a pressure increasing operation is performed to increase the brake fluid pressure in the wheel cylinder by opening the in-valve 42, thereby increasing the braking force for braking the vehicle wheel. The above-described pressure reducing, maintaining and increasing operation is repeatedly performed each time it is detected that the vehicle wheel has a tendency of locking. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are magnetized so as to be closed, thereby preventing a fluid pressure fluctuation associated with the operation of the ABS 24 from being transmitted as a kickback from the master cylinder 11 to the brake pedal 12.

If the slave cylinder 23 becomes inoperable due to power failure or other problem, the braking control is performed using the brake fluid pressure generated by the master cylinder 11 in place of the brake fluid pressure generated by the slave cylinder 23.

Figure 2:
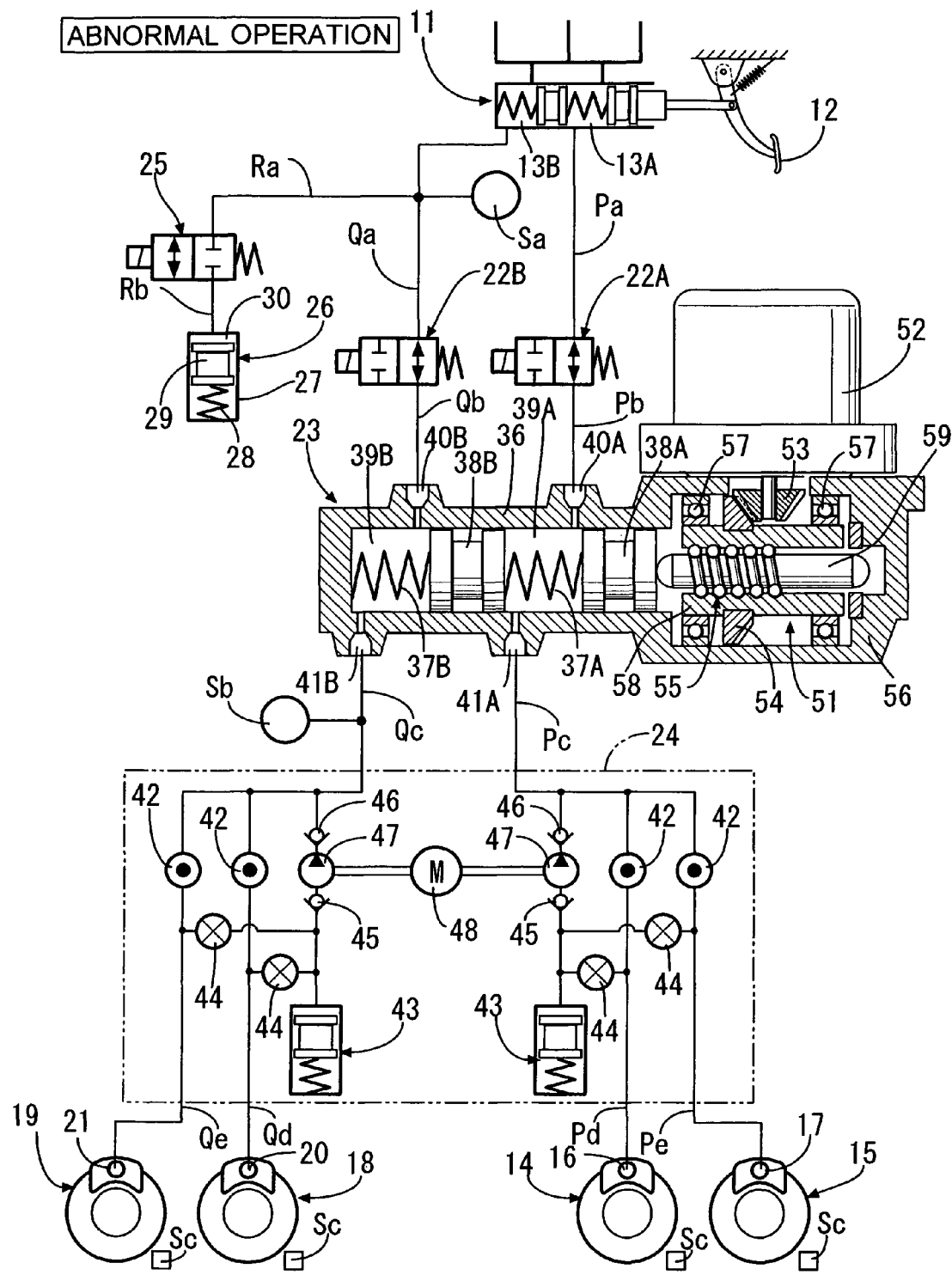
FIG. 2 is a fluid-pressure circuit diagram of a vehicle brake system corresponding to FIG. 1 under abnormal operating conditions.

That is, in the event of power failure or other problem, as shown in FIG. 2, the shutoff valves 22A and 22B, comprising normally open solenoid valves, remain open; the reaction force permission valve 25, comprising a normally closed solenoid valve is automatically closed; the in-valves 42, comprising normally open solenoid valves, are automatically opened; and the out-valves 44, comprising normally closed solenoid valves, are automatically closed. In this state, the brake fluid pressure generated in the fluid pressure chambers 13A and 13B of the master cylinder 11 passes the shutoff valves 22A and 22B, the fluid pressure chambers 39A and 39B of the slave cylinder 23 and the in-valves 42, without being absorbed by the stroke simulator 26, and operates the wheel cylinders 16, 17, 20, and 21 of the disc brake devices 14, 15, 18, and 19, respectively, for braking the vehicle wheels, thus generating the braking force without any problem.

When a problem occurs in the electric motor 52 of the actuator 51 of the slave cylinder 23 which renders the electric motor 52 incapable of rotating or that causes a seizure of the drive bevel gear 53, follower bevel gear 54, ball screw mechanism 55 or the like of the actuator 51 of the slave cylinder 23, the slave cylinder 23 becomes incapable of generating brake fluid pressure. Therefore, it is required for the brake system to quickly and reliably detect a problem and perform a backup process.

Next, the operation of a problem determination process with respect to the slave cylinder 23 will be described in reference to FIG. 4.

First, if it is determined at Step S1 that the driver is not applying a pushing force to the brake pedal 12 and the fluid pressure sensor Sa does not detect a brake fluid pressure generated by the master cylinder 11, that is, the brake is not being operated, and if it is detected a pushing force is being applied that the accelerator pedal at Step S2, and if the motor rotational sensor Se detects at Step S3 that the actuator 51 of the slave cylinder 23 is not being operated, a problem determination is performed on the slave cylinder 23 at Step S4 and the subsequent steps.

If the problem determination is performed while the slave cylinder 23 is generating brake fluid pressure, the generation of brake fluid pressure is interrupted. Therefore, the above-described Steps S1 to S3 are performed in order to confirm that the slave cylinder 23 is not being operated at that time or that there is no need to operate the slave cylinder 23 during the problem determination. If it is confirmed that a pushing force is being applied to the accelerator pedal at Step S2, it is possible to confirm that the driver has no intention of applying a pushing force to the brake pedal 12. Thus, it is possible to ensure that a pushing force is not applied to the brake pedal 12 while the problem determination is being performed at Step S4 and the subsequent steps.

At Step S4, upon a command from the electronic control Unit U, for a very short time an electric current is supplied to electric motor 52, such that the pistons 38A, 38B of the slave cylinder may be driven a microdistance or very small distance in a retreating direction (direction opposite to the brake fluid pressure generating direction) from the standard positions (stop positions when brake fluid pressure is not generated). As a result, when the motor rotational position sensor Se detects at Step S5 that the electric motor 52 has rotated the pistons 38A, 38B in the opposite direction, it is determined that the slave cylinder 23 can be normally operated, and at Step S6 the pistons 38A, 38B are driven forward to the above-described standard positions by driving the electric motor 52 in the brake fluid pressure generating direction. In other words, if the slave cylinder 23 can be normally operated, for a very short time an electric current is supplied to the electric motor 52, such that pistons 38A, 38B of the slave cylinder are driven an equal microdistance or very small distance in the fluid pressure generating direction to offset the prior movement in the opposite direction.

On the other hand, if the motor rotational position sensor Se does not detect at Step S5 that the electric motor 52 has rotated in the opposite direction of the pistons 38A, 38B, it is determined that there has occurred a problem that makes the electric motor 52 incapable of rotating, or a problem that causes a seizure of the drive bevel gear 53, the follower bevel gear 54, ball screw mechanism 55 or the like of the actuator 51 of the slave cylinder 23, the backup braking process is performed at Step S7 for braking using the brake fluid pressure generated by the master cylinder 11.

The backup braking process is performed, for example, by shutting off supply of the power to the brake system. As a result, the shutoff valves 22A, 22B, which are normally-open solenoid valves, are opened and the reaction force permission valve 25, which is a normally-closed solenoid valve, is closed, whereby the fluid pressure circuit enters an abnormal operation state as shown in FIG. 2, thereby enabling braking involving the brake fluid pressure generated by the master cylinder 11.

When the above-described problem determination process is performed, the pistons 38A, 38B are in the standard positions, and the master cylinder 11 and the wheel cylinders 16, 17, 20, 21 communicate with each other. Therefore, when it is determined that a problem has occurred, it is possible to perform the backup braking process without any problem by transmitting the brake fluid pressure generated by the master cylinder 11 to the wheel cylinders 16, 17, 20, 21 without shutting off the brake fluid pressure at the slave cylinder 23.

As described above, an electrical current is supplied so as to rotate the electric motor 52 of the slave cylinder 23 in a direction opposite to the braking force generating direction, and it is determined that a problem has occurred when the rotation of the electric motor 52 is not detected. Therefore, it is possible to reliably perform the problem determination process even if the slave cylinder 23 is not being operated. Also, the problem determination process can be performed before the operation of the slave cylinder 23, thereby quickly performing the backup braking process when it is determined that a problem has occurred.

An exemplary embodiment of the present invention has been described above, but various changes in design may be made without departing from the subject matter of the present invention.

For example, the electric brake force generator of the present invention is not limited to the slave cylinder 23 of the exemplary embodiment. The electric brake force generator may be of a mechanical type (non-fluid-pressure type) that generates a braking force by directly driving a brake pad using the electric motor 52.

As another example, in the exemplary embodiment, a problem in the slave cylinder 23 is detected by use of the motor rotational position sensor Se. However, this problem may be detected based on the rotational position of the output shaft 59, the axial position of the output shaft 59, and the axial positions of the pistons 38A, 38B.

As a third example, in the exemplary embodiment, the fluid pressure sensor Sa detects a pushing force being applied to on the brake pedal 12 by the driver, however, a pedal switch may be used to detect depression of the brake pedal.

What is claimed is:

1. A brake system comprising:
   an electric brake force generator that brakes a wheel by a driving force of an electric motor; and
   a problem determining device that supplies an electrical current so as to rotate the electric motor in a direction opposite to a brake force generating direction, and determines that a problem has occurred when rotation of the electric motor is not detected;
   wherein when the problem determining device does not determine that a problem has occurred after supplying the electrical current to rotate the motor in the direction opposite to the brake force generating direction, the problem determining device then supplies an electrical current to the motor so as to rotate the motor in the brake force generating direction so as to offset the rotation in the opposite direction.

2. The brake system according to claim 1, wherein the problem determining device performs a problem determination process when a driver is applying a pushing force to an accelerator pedal.

3. The brake system according to claim 1, wherein the problem determining device performs a problem determination process when the electric brake force generator is not generating brake fluid pressure.

4. The brake system according to claim 3, further comprising:
   a master cylinder that generates brake fluid pressure by a braking operation by a driver;
   a wheel cylinder that brakes the wheel by the brake fluid pressure generated by the master cylinder or the electric brake force generator; and
   a controller which controls the master cylinder and the wheel cylinder to communicate with each other when the electric brake force generator is not generating brake fluid pressure,
   wherein the electric brake force generator generates brake fluid pressure by the driving force of the electric motor, and the electric brake force generator is arranged between the master cylinder and the wheel cylinder.

5. The brake system according to claim 1, wherein the electrical current supplied by said problem determining device is sufficiently small such that it may rotate the electric motor only a very small amount in the direction opposite to the braking force generating direction.

6. A brake system, comprising:
   a master cylinder for generating brake fluid pressure by braking operation of a driver;
   an electric brake force generator including a slave cylinder, an actuator which actuates the slave cylinder, and an electric motor which drives the actuator to generate a brake fluid pressure;
   a wheel cylinder for braking a wheel using brake fluid pressure generated by either said master cylinder or said slave cylinder; and
   a controller which supplies an electric current to the electric motor to drive the electric motor in a direction opposite to a brake force generating direction to determine if a problem has occurred relative to operation of the slave cylinder;
   wherein if said problem has not occurred the controller provides the brake fluid pressure from the slave cylinder to the wheel cylinder, and if said problem has occurred the controller provides the brake fluid pressure from the master cylinder to the wheel cylinder; and
   wherein when the problem determining device does not determine that a problem has occurred after supplying the electrical current to rotate the motor in the direction opposite to the brake force generating direction, the problem determining device then supplies an electrical current to the motor so as to rotate the motor in the brake force generating direction so as to offset the rotation in the opposite direction.

7. The brake system according to claim 6, further comprising a shutoff valve located between the master cylinder and the slave cylinder.

8. The brake system according to claim 7, wherein the shutoff valve is normally closed when a problem has not occurred within the slave cylinder and is opened when a problem has occurred within the slave cylinder.

9. The brake system according to claim 6, wherein the brake system further comprises an anti-lock brake system arranged between the slave cylinder and a plurality of wheel cylinders which can individually control a braking force generated by each of the wheel cylinders.

10. The brake system according to claim 7, wherein the brake system further comprises an anti-lock brake system arranged between the slave cylinder and a plurality of wheel cylinders which can individually control a braking force generated by each of the wheel cylinders.

11. The brake system according to claim 10, wherein the shutoff valve is closed at least when the anti-locking brake system operates.

12. The brake system according to claim 6, further comprising a stroke simulator in communication with the master cylinder via a reaction force permission valve which is opened when a problem has not occurred and closed when a problem has occurred.

13. The brake system according to claim 7, further comprising a stroke simulator in communication with the master cylinder via a reaction force permission valve which is opened when a problem has not occurred and closed when a problem has occurred.

14. The brake system according to claim 6, wherein the electrical current supplied by said problem determining device is sufficiently small such that it may rotate the electric motor only a very small amount in the direction opposite to the braking force generating direction.

* * * * *